United States Patent

Schlager

[15] 3,654,012
[45] Apr. 4, 1972

[54] METHOD OF MAKING A COMPOSITE PLASTIC ARTICLE OF MANUFACTURE

[72] Inventor: Wilfred C. Schlager, Chicago, Ill.
[73] Assignee: Uniroyal Inc., New York, N.Y.
[22] Filed: Feb. 4, 1970
[21] Appl. No.: 8,524

[52] U.S. Cl. ................................156/212, 156/78, 156/285, 156/286
[51] Int. Cl. .........................................................B29c 17/00
[58] Field of Search.......................156/78, 79, 212, 213, 285; 264/45, 47

[56] References Cited

UNITED STATES PATENTS

| | | | |
|---|---|---|---|
| 3,234,065 | 2/1966 | Best | 156/285 X |
| 3,466,214 | 9/1969 | Polk et al. | 156/285 X |
| 3,080,267 | 3/1963 | Schmalz | 156/78 X |
| 3,176,055 | 3/1965 | Loos | 156/79 X |
| 3,264,157 | 8/1966 | Lattimer | 156/285 X |

Primary Examiner—Carl D. Quarforth
Assistant Examiner—S. R. Hellman
Attorney—Robert J. Patterson

[57] ABSTRACT

A layer of thermoplastic sheet material such as sheet ABS is heated to a temperature at which it is thermally formable and while at this temperature is thermally formed, as by differential gas forming, typically vacuum forming, against a shaped body of cellular thermoplastic material such as expanded polystyrene. As a result of the heat in the sheet as it is drawn against the cellular body which is at room temperature, fusion welding of the sheet to the surface of the cellular body at the interface takes place. No cement or other adhesive, organic solvent or the like is used. The result is that the cellular body is protected against puncturing, shattering under impact, abrasion, and other physical influences that would normally tend to injure it and is made much stronger. The disadvantages of prior attempts to make such composites, such as the need for preforming the sheet and then bonding it to the body and the need t use solvent-based cements or organic solvents, are completely obviated. The invention is exemplified by the manufacture of a boat having an expanded polystyrene core and layers of sheet ABS covering and fusion welded to its interior and exterior surfaces.

8 Claims, 9 Drawing Figures

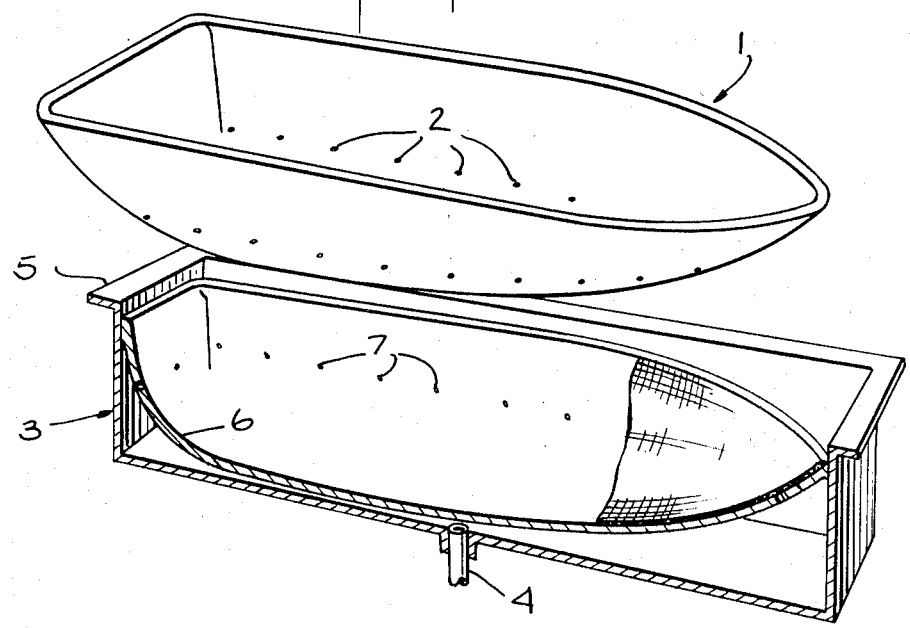
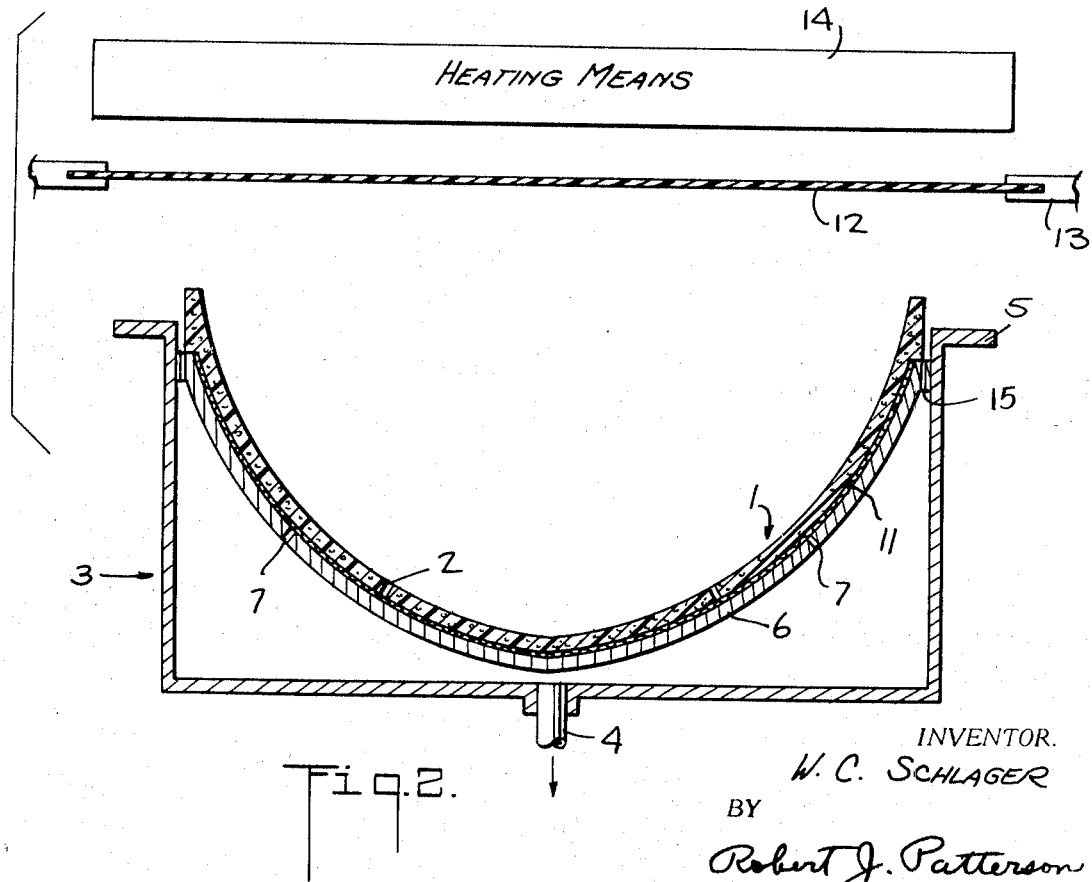

Patented April 4, 1972
3,654,012
3 Sheets-Sheet 2
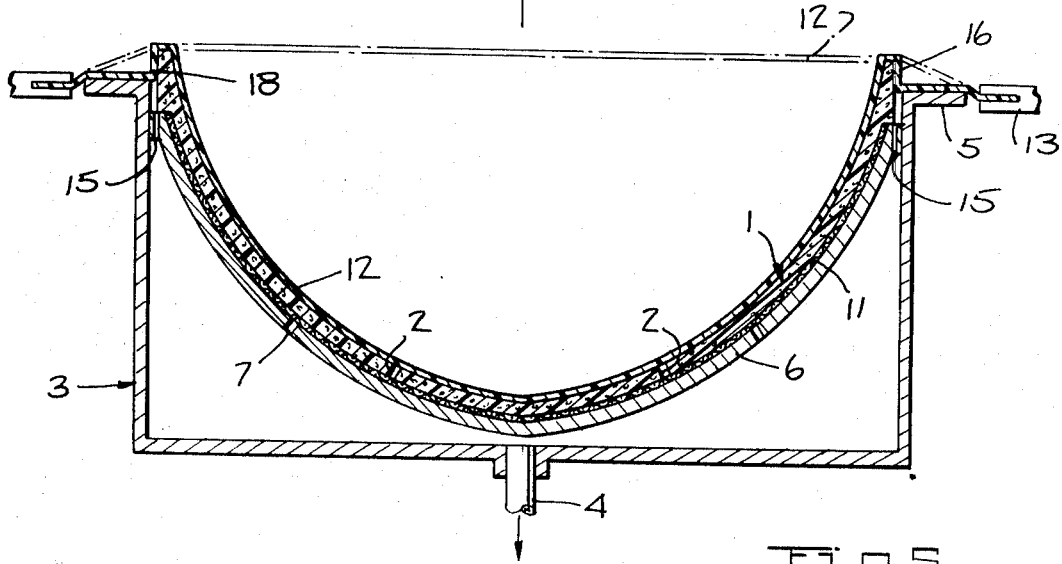
Fig. 3.
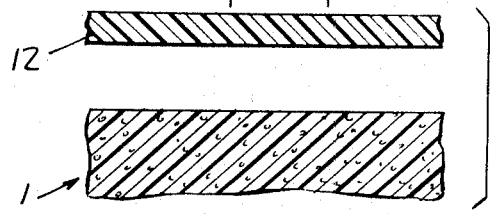
Fig. 4.
Fig. 5.
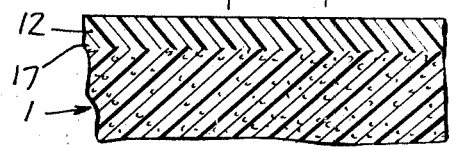
Fig. 6.
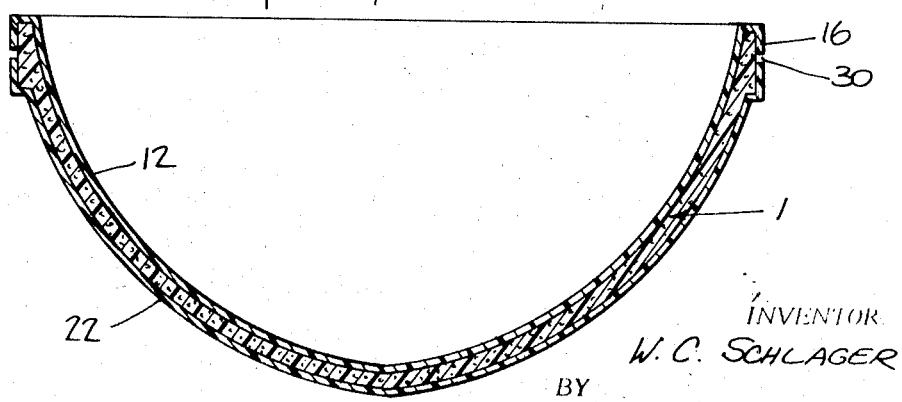
Fig. 7.
INVENTOR
W. C. SCHLAGER
BY
Robert J. Patterson
ATTORNEY

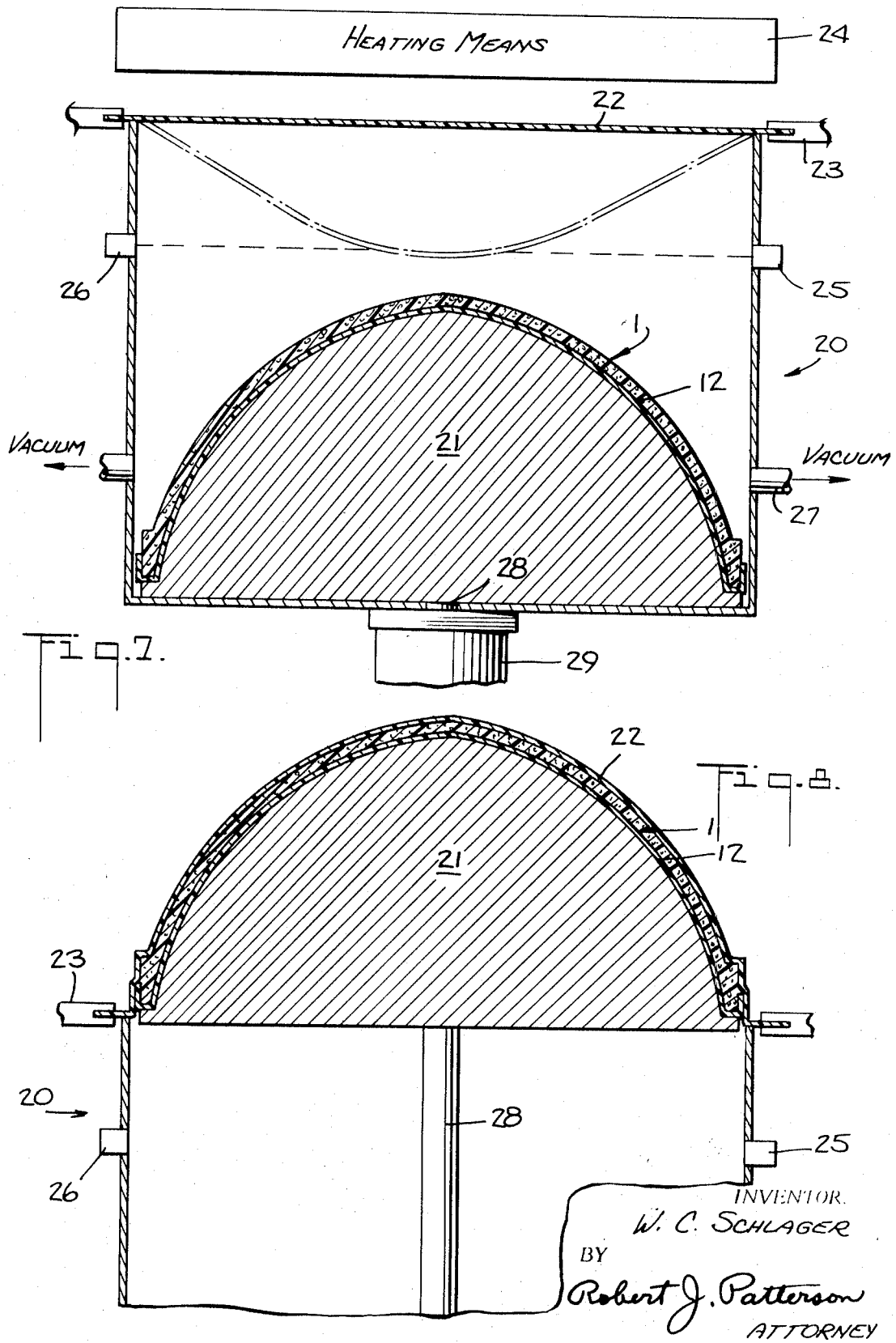

METHOD OF MAKING A COMPOSITE PLASTIC ARTICLE OF MANUFACTURE

BACKGROUND OF THE INVENTION

1. The Field of Invention

The invention relates to composite articles comprising a layer of thermoplastic sheet material which is tenaciously fusion welded to a shaped body of cellular thermoplastic material and to the method of making such composite articles by thermal forming, as by differential gas forming typified by vacuum forming, and drawing the heated thermoplastic sheet material against the body of cellular thermoplastic material whereby the heat in the sheet causes fusion welding to the surface of the cellular body without the need for performing the sheet to the shape of the body or for resort to use of adhesives such as organic solvent-based cements or of volatile organic solvents.

2. Description of the Prior Art

Heretofore efforts have been made to strengthen and protect cellular thermoplastic bodies by various techniques such as preforming the cover component in some manner, as by injection molding, cold forming or vacuum forming, and then fitting the preformed part to the cellular part whereby the two preformed parts are mated. A major difficulty has been that of getting a tight close fit between the two parts; this difficulty is in large part due to the fact that it is virtually impossible to make the cellular part with close dimensional tolerances, this being especially true when it is made in the well-known manner from expandable polystyrene beads. Frequently in prior art attempts to solve the problem, resort was had to the use of adhesives interposed between the two parts but these invariably contained volatile organic solvents which present a fire or toxicity problem and cause deterioration of the expanded thermoplastic part. The problem and various attempts to solve it are shown in U.S. Pat. No. 2,865,800 and on pages 250 and 266 of "Rigid Plastic Foams," by Ferrigno, Second Edition, published 1967 by Reinhold.

In some cases, attempts were made to overcome the structural weakness of cellular thermoplastic materials such as expanded polystyrene (whether made from beads or by extrusion of polystyrene containing a volatile organic liquid as a blowing agent) by coating resin-fiber glass onto the outside of the cellular body and then hardening the resin. Such attempts have been quite unsatisfactory.

So far as applicant is aware, all of the prior art attempts to solve the problem of overcoming the structural weakness of rigid cellular thermoplastic materials, such as expanded styrene, with respect to low tensile strength, ease of rupture, penetration or fragmentation by impacting bodies, poor abrasion-resistance, etc. have been attended with serious drawbacks.

The present invention completely obviates the need for preforming the protective material as well as the need for using adhesives or volatile solvents or for applying a resin-fiber glass coating on the cellular body. The invention also insures perfect conformity of the protective sheet to the cellular body over the entire surface of the latter despite variations in such surface, and accomplishes fusion welding of the protective thermoplastic to the cellular body contemporaneously with the vacuum forming step. It does this with very little discernible solidification or collapse of the cellular body at the interface with the sheet; at most solidification of the surface of a polystyrene bead foam body protected by the invention appears to be limited to one thirty-secondth of an inch. Thus, the invention brings about new and unobvious results and advantages.

The only possible exception to perfect conformity of the protective sheet to the cellular body in the practice of the invention would be in locations where there is a very acute angle, as a 90° angle, in the surface of the cellular body against which drawing is effected. Examples would be portions of the inside of the boat hull described hereinafter where the mast socket and the centerboard slot are provided in the bottom of the hull. The formation of voids or disconformities at such portions can easily be obviated by molding them with a fillet of the proper dimensions and/or by providing vacuum ports at the proper locations in such areas.

SUMMARY OF THE INVENTION

The invention has both product and method aspects. In its product aspect it resides in an article comprising a shaped body of cellular thermoplastic material such as expanded polystyrene (of any type, e.g. extruded polystyrene foam or polystyrene bead foam) having a layer of thermoplastic sheet material, typified by ABS (acrylonitrile-butadiene-styrene polymer), fusion welded to said shaped body at the interface therebetween. In its process aspect it resides in heating a layer of such thermoplastic material to a temperature at which it is thermally formable, and then thermally forming, typically by vacuum forming, the heated sheet material against the shaped cellular thermoplastic body preferably using differential gas pressure forming techniques which per se are well-known to the art (For details of such forming techniques see, for example "Plastic Sheet Forming" by Butzko, published 1958 by Reinhold). Vacuum forming is preferred. As the heated sheet is formed it is drawn tightly against the cellular body and air is expelled at the interface as the sheet is drawn, with the result that it is caused to exactly conform to the surface of the cellular body and as the hot sheet contacts the surface of the foamed body, which typically is at room temperature and in any event is at a temperature far below its fusion temperature which often is well below the temperature of the sheet, the surface of the foamed body softens sufficiently so that it fuses with the sheet at the interface giving a very strong fusion bond. Since the foamed body is an excellent heat insulator, i.e. has very low thermal conductivity, the heating and fusion of its surface is restricted to a very thin surface layer. This insures against deformation of the cellular body which would occur were widespread thermal degradation and collapse thereof to take place. At the same time, the use of organic solvent-based cements or of organic solvents (with their attendant toxicity and fire hazard), both of which would cause degradation or shrinkage of the foamed plastic body into a non-cellular mass, is avoided in the present invention.

Because of the structural weakness of many cellular bodies being protected and strengthened by the present invention, it is necessary, in the practice of the invention, to rigidly support such bodies against breakage or deformation while the vacuum forming operation is being carried out.

DESCRIPTION OF THE DRAWINGS

In the accompanying drawings, which portray the manufacture of an all-plastic boat having a cellular thermoplastic hull body protected over its entire interior and exterior by a sheet of thermoplastic material by the present invention;

FIG. 1 is a perspective of the boat hull body before application of the protective thermoplastic skin layer and of the vacuum box used to apply the protective skin over the interior surface of the body;

FIG. 2 is a transverse vertical sectional view showing the arrangement just prior to application of the inner protective layer to the hull body;

FIG. 3 is a similar sectional view, showing the hull body after the inner skin has been applied thereto, the broken lines showing the sheet plastic layer positioned over the hull body and the vacuum box before the forming step;

FIG. 4 is a detailed section of a portion of the hull body and the support therefor, showing how the vacuum is applied to the body to accomplish the vacuum forming;

FIG. 5 is a greatly enlarged section showing portions of the skin layer and the boat body before they come into contact;

FIG. 6 is a similar enlarged section showing the laminated structure which results from the fusion bonding of the skin to the hull body in the vacuum forming step;

FIG. 7 is a transverse vertical sectional view showing the inverted boat hull body in another vacuum box preparatory to application of the protective skin to the outer surface of the hull body;

FIG. 8 is a similar view showing the arrangement at the completion of application of the outer protective plastic skin; and FIG. 9 is a transverse sectional view of the completed boat.

DESCRIPTION OF THE PREFERRED EMBODIMENT

Referring now to the accompanying drawings, which portray a preferred embodiment of the invention as employed for the manufacture of an all-plastic boat having a cellular core protected on both the inside and the outside by a thermoplastic skin layer, a boat hull body 1, which typically is made in known manner from expandable polystyrene beads and has a wall approximately 2 inches thick, has applied to its entire inner surface a skin 12 of ABS thermoplastic material 0.060 inch thick (before drawing) in the manner portrayed in FIGS. 1 through 6. Holes 2 are made through the body 1 at appropriate points in any suitable manner, as by piercing with hot needles or by drilling, to enable application of vacuum effectively during the vacuum forming step. Typically holes 2 are located in a horizontal plane near the bottom of the boat and are positioned entirely around body 1 indicated in FIG. 1.

The vacuum box 3 used in applying the inner skin comprises a bottom and sidewalls, a vacuum pipe 4 connected to a source of vacuum (not shown), and an upper flange 5 at the top of its walls. Because the core body 1 is ordinarily not strong enough to withstand the tremendous total pressure exerted by the atmosphere during the vacuum forming step it is usually necessary to rigidly support it against deformation or crushing by a strong and rigid support member 6 positioned in the vacuum box prior to placement of the core body 1 therein, reinforcing and bracing (not shown) being provided where necessary. Support member 6 is preferably made of epoxy resin strongly reinforced with fiber glass. In order to transmit the vacuum through support 6, holes 7 are provided therein. Because of the practical difficulty of securing registration of holes 7 with holes 2, it is convenient to provide wire screen 11 between core 1 and support 6, thereby providing free air passage at all times from holes 2 to holes 7 and thence into the interior of the vacuum box 3. Screen 11 should of course extend at least over the area embracing holes 2 and holes 7.

The sheet 12 of ABS material to be vacuum drawn into the interior of the hull body is framed in any suitable clamping means 13 somewhat larger than the flange 5 of the vacuum box. Sheet 12 is then heated to a temperature at which it is vacuum formable in any suitable manner as by heating means 14 disposed above it. Typically sheet 12 is heated to about 350° F. whereupon the clamping frame 13 is lowered over the vacuum box so that the sheet assumes the broken line position shown in FIG. 3 in which it is stretched airtightly across the vacuum box 3. Vacuum is then applied causing the sheet 12 to be drawn into exact conformity with the interior of the hull body 1 and to be tenaciously fusion welded thereto as a result of the heat in the sheet 12 as it contacts the core. The air is pulled out ahead of the sheet as it comes into engagement with the surface of the core. Vacuum ports 15 are provided in the uppermost gunwale-supporting portions of support 6 in order to pull the sheet 12 down into the solid line position, as shown at the right and left portions of FIG. 3, and form a fusion welded skin portion 16 on the outside of the gunwales of the boat. As will be obvious to those skilled in the art, heat can be applied throughout the vacuum forming step by means 14 which typically may be a bank of infrared heating lamps extending over the entire area of the sheet.

As a result of the vacuum forming operation, skin 12 is tenaciously fusion welded to the core 1. This is indicated in FIG. 6 wherein the line of welding or coalescence at the interface is indicated by 17. The fusion welding occurs as a result of very limited fusion and collapse of the outermost portion of the core 1, the limitation of the fusion welding being due to the fact that core 1 is a very good insulator and the heat in sheet 12 is rather rapidly dissipated.

The application of heat by means 14 is discontinued at or before completion of the vacuum drawing step. As soon as the vacuum drawing step is complete, cooling air is directed, as by fans (not shown), onto the resulting inner surface of the boat hull to cool the skin and minimize transfer of destructive heat into the cellular body beyond that required to achieve the desired fusion welding.

The boat body is then removed from the vacuum box 3. The surplus edge of the skin layer is trimmed off as at line 18 in the outer gunwale portion.

The boat hull is then inverted and placed in another vacuum box designated generally as 20 (FIGS. 7 and 8) on rigid supporting member 21 which again preferably is made of epoxy resin-glass fiberlike support 6 which of course can be reinforced and braced where necessary and which has an exterior closely conforming to the interior of the boat hull so as to support it during the second vacuum forming step. The ABS sheet 22 which is to form the outer skin is framed across the open top of vacuum box 20 by clamping means 23. Heat is applied by overhead heating means 24, causing sheet 22 to be brought to a temperature of about 350° F. and to sag into the broken line position shown in FIG. 7. The attainment of this position is determinable by electric eye transmitter means 25 and receiver means 26 located in the wall of vacuum box 20. The vacuum forming step is now begun, this being accomplished by the application of vacuum through pipe 27 and by moving support 21 upwardly by cylinder 28 operated by a piston (not shown) in hydraulic or pneumatic cylinder 29. The uppermost portion of the boat hull contacts the lowermost portion of sagging sheet 22, air is pulled out ahead of the engagement of sheet 22 with the boat hull, and the assembly finally reaches the position of complete drawing shown in FIG. 8. Heating means 24 is of course raised into a retracted position (not shown) and allowed to cool at an appropriate point in the cycle not later than the completion of the draw; as soon as the draw is complete the outer skin 22 is cooled with air, as with fans (not shown) to limit the extent of collapse of the cellular core at the interface. The surplus skin material at the edge of the boat is then trimmed in the gunwale area. As indicated in FIG. 9, there typically is a small gap 30 between the two edges of skins 12 and 22 in the gunwale area. This narrow band 30 is preferably covered in any suitable way as by application of a decorative strip (not shown) thereover.

It will be seen that in the embodiment just described each of the heated plastic sheets is positioned in a plane generally parallel to the gunwale portions or, stated otherwise, to any flotation plane of the boat hull, and is then drawn with elongation of the sheet and continuous expulsion of air as the sheet contacts the hull body resulting in perfect conformance of each sheet with the hull body over the entire surface thereof.

The resulting boat hull is far more resistant to impact, puncturing, abrasion, and other deteriorating influences than the unprotected expanded polystyrene core would be by itself. Both the exterior and the interior skin layers are firmly fusion bonded to the expanded polystyrene core and can be separated therefrom only with great difficulty. If a portion of the skin is forceably separated from the surface of the core, it is noted that a fine layer of polystyrene foam adheres to the surface of the separated skin, this being indicative of the tenacious bonding achieved at the interface of the two plastic materials by the present invention.

GENERAL

As already indicated, the technique of the present invention is highly advantageous because it does not entail the use of any cements or volatile solvents in order to achieve bonding of the protective layer to the cellular core. In addition, as the skin layers 12 and 22 cool, they cause a compressive effect on the cellular core body as a result of shrinkage of the skins. This greatly enhances the strength of the cellular body in a manner somewhat analogous to the technique of pre-stressing concrete. The invention provides a unique low cost method of producing high strength/weight ratio composite panels and other structures.

While the invention has been exemplified by the application of a thermoplastic ABS skin material to expanded polystyrene, it is not limited thereto but can be used to apply any thermoplastic skin material to any cellular thermoplastic material provided the two materials are sufficiently compatible under the conditions of the vacuum forming to effect fusion welding of the skin to the cellular material. Examples of thermoplastic materials which can be used either for the skin or for the cellular body are polyvinyl chloride and related vinyl polymers such as vinyl chloride-vinyl acetate copolymer, polyvinyl dichloride, polystyrene, polycarbonate, acrylonitrile-styrene-acrylate (ASA), polyphenylene oxide, polysulfone, ABS, blends of the foregoing materials with one another or with ABS, polyolefins such as polyethylene, polypropylene, ethylene-propylene copolymers, EPDM (uncured), cellulose acetate, cellulose acetate butyrate, styrene-butadiene copolymers including styrene-butadiene block copolymers, thermoplastic polyurethanes, etc.

The cellular body used as the core can be of any density ranging from as low as one pound per cubic foot to as high as 50 pounds per cubic foot or even higher. The foam may be unicellular, i.e. with non-intercommunicating cells or may have a spongy structure, with intercommunicating cells, the choice being dictated by the kind of the final article and the conditions of its service. All thicknesses of thermoplastic sheet can be used to form the protective layer. The protective sheet is usually non-cellular; however, it can be cellular in those instances where a cellular sheet is thermally formable and will impart the desired strength and protection to the interior core body; examples of such thermally formable cellular sheet are the laminated structures shown in U.S. Pat. Nos. 3,041,220; 3,070,817; 3,206,354; 3,356,560 and 3,386,878.

The types of articles which can be made by the invention are virtually unlimited. In addition to use for making boats, it can be used to make engine covers, containers of all types, material handling devices such as pallets, ice buckets, ice chests, luggage, surfboards, etc. It can be used to make insulating structural members such as wall panels, etc.

The invention can be used to make composite articles of almost every conceivable shape. For making a flat insulating wall panel, for example, one or both surfaces of a flat body of cellular thermoplastic material, such as polystyrene bead foam, can be provided with a protective thermoplastic skin, preferably treating such a flat shape in the manner used for protecting a convex surface, i.e., in the way generally portrayed in FIGS. 1 to 3.

Having thus described my invention, what I claim and desire to protect by Letters Patent is:

1. The method of making a composite article comprising a sheet of thermoplastic material conforming and bonded by fusion welding to a shaped non-planar body of cellular thermoplastic material compatible therewith which comprises heating said sheet to a temperature at which it is thermally formable and which is above the fusion temperature of said body, and thereafter conforming this sheet, while it is heated to a temperature as above defined and while it is clamped peripherally, to a non-planar surface of said body, said body being at a temperature well below its fusion temperature, and bonding said sheet to said surface by fusion welding at the interface by forming and drawing said sheet with elongation tightly against said non-planar surface by applying differential gas pressure to the heated clamped sheet, effecting relative movement of said sheet and said body towards each other, and continuously expelling air from between said sheet and said surface ahead of said sheet as said sheet comes into engagement with said surface, said shaped body during said forming and drawing being rigidly supported against deformation or crushing, and limiting the transfer of heat from the sheet into said body to that required to achieve fusion welding at the interface.

2. The method of claim 1 wherein the heating of said body is limited to the heating thereof resulting from contact with said heated sheet.

3. The method of claim 2 including the further step of cooling the outer surface of the sheet of the final composite article.

4. The method of claim 2 wherein said body is formed from expanded polystyrene.

5. The method of claim 4 wherein said sheet is formed from acrylonitrile-butadiene-styrene polymer.

6. The method of claim 5 wherein said body is an open boat hull body.

7. The method of enhancing the impact- and abrasion-resistance of an open boat hull body made of expanded polystyrene which comprises conforming and bonding by fusion welding a peripherally clamped, heated sheet of thermoplastic material to the interior surface of said body by the method of claim 16, said peripherally clamped sheet being initially disposed across the top of the hull body in a plane generally parallel to a flotation plane of the hull body, cooling the drawn sheet after it has been conformed and bonded to the interior surface of the hull body, and then conforming and fusion welding a second peripherally clamped sheet of thermoplastic material to the exterior surface of said body by the method of claim 2, said peripherally clamped second sheet being initially disposed in a plane generally parallel to a flotation plane of the hull body.

8. The method of claim 7 wherein said sheets are formed from acrylonitrile-butadiene-styrene polymer.

* * * * *

UNITED STATES PATENT OFFICE
CERTIFICATE OF CORRECTION

Patent No. 3,654,012   Dated August 11, 1972

Inventor(s) WILFRED C. SCHLAGER

It is certified that error appears in the above-identified patent and that said Letters Patent are hereby corrected as shown below:

Column 1, line 15, the word "performing" should read --preforming--.

Column 6, line 40, claim 7, the claim reference numeral "16" should read --2--.

Signed and sealed this 5th day of December 1972.

(SEAL)
Attest:

EDWARD M. FLETCHER, JR.
Attesting Officer

ROBERT GOTTSCHALK
Commissioner of Patents